J. HUMBRECHT.
DISTANCE MEASURING INSTRUMENT.
APPLICATION FILED SEPT. 9, 1912.

1,088,701.

Patented Mar. 3, 1914.

(4--4)

Witnesses:—

Inventor
Jules Humbrecht
by
Brown, Raegener, Moody & ——
his Attys

UNITED STATES PATENT OFFICE.

JULES HUMBRECHT, OF GROSS-LICHTERFELDE, NEAR BERLIN, GERMANY, ASSIGNOR TO THE FIRM OF OPTISCHE ANSTALT C. P. GOERZ AKTIENGESELLSCHAFT, OF BERLIN, GERMANY.

DISTANCE-MEASURING INSTRUMENT.

1,088,701. Specification of Letters Patent. Patented Mar. 3, 1914.

Application filed September 9, 1912. Serial No. 719,269.

*To all whom it may concern:*

Be it known that I, JULES HUMBRECHT, a citizen of the German Empire, and resident of Gross-Lichterfelde, near Berlin, Germany, have invented certain new and useful Improvements in and Relating to Distance-Measuring Instruments, of which the following is a specification.

This invention relates to a distance measuring device provided with two rotatable wedge-shaped transparent plates adapted to produce lateral displacement of the rays of light coming from the object the distance of which is to be measured on passing through said wedge-shaped plates.

The new device is illustrated in the accompanying drawing wherein—

Figure 1:
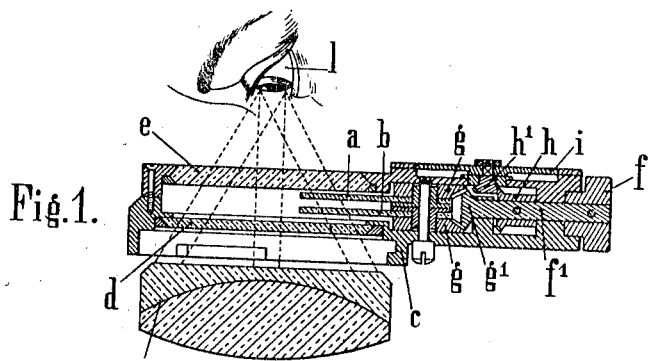
Figure 2:
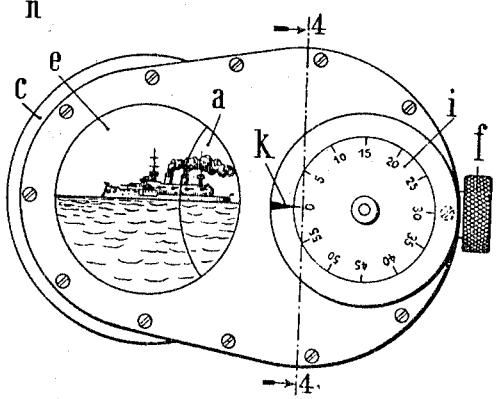
Figure 4:
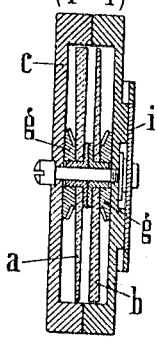
Figure 3:
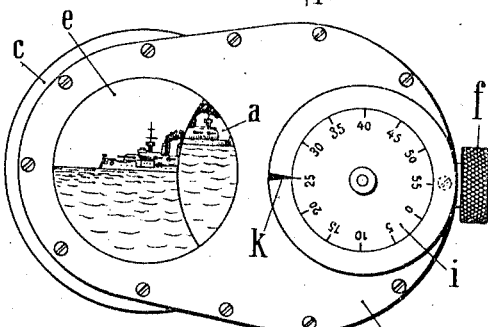
Figure 5:
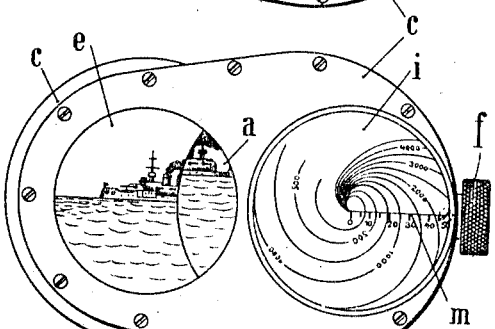

Figure 1 shows a middle cross-section through the instrument inserted between a lens and the ocular of an observer. Figs. 2 and 3 show elevations of the instrument with different positions of images in the field of view. Fig. 4 is a section on the line 4—4 of Fig. 2. Fig. 5 is an elevation of an embodiment having a modified indicating device.

The two wedge-shaped measuring plates are designated $a$, $b$. These plates are formed of a transparent material such as glass and firmly connected with hub-like members of metal each provided with a conical gearing $g$. Meshing with said conical gearings $g$ is a pinion $g'$ firmly mounted on a shaft $f'$ carrying a knob $f$. Said shaft $f'$ is provided with the further conical gearing $h$ meshing with the teeth $h'$ of a conical pinion firmly connected with a rotatable scale plate $i$. The scale plate $i$ is inclosed by an index ring with pointer $k$. The wedge-shaped plates $a$, $b$ project into a tubular mount $c$ provided with glass plates $d$, $e$ one on each side of the wedge plates $a$, $b$ so that said wedge plates are protected by plates $d$, $e$ against injury. On rotating the knob $f$ the wedges $a$, $b$ are rotated in opposite directions so that the deviation of rays of light passing through said plates is changed depending on the wedge shape of the plates $a$, $b$. The outer edges of the plates $a$, $b$ are of circular form and arranged in line with each other.

If the instrument is inserted in the path of the rays coming from a distant object the rays pass through that part of the instrument outside the wedge plates $a$, $b$ without deviation whereas deviation takes place for that part of the rays passing through the wedge plates $a$, $b$, the amount of this deviation depending on the adjustment of plates $a$, $b$. If now an object of known size is observed and if the plates $a$, $b$ are so adjusted that the parts of the image of said object separated by the circular edge of plates $a$, $b$ are displaced with relation to each other to an amount equal to the size of the observed object as illustrated in Fig. 3 of the drawing then the adjustment of plates $a$, $b$ is characteristic for the distance of said object. If for instance, the instrument is used for measuring the distance of men-of-war and if it is known that the distance of the top edge of the chimney is 25 meters over the level of the water and if the graduation on the scale plate $i$ is made for objects of this size then the point of the graduation opposite the pointer $k$ indicates the distance of said objects. In the case of Figs. 2 and 3 of the drawing it is assumed that the unit of the graduation is equal to 100 meters so that the distance of the ship visible in the field of view of Fig. 3 would be equal to 2500 meters.

The graduation shown in Figs. 2 and 3 is adapted to the observation of objects of definite known size, for instance 25 meters as in the above example. If the objects of observation are of different size then the distance cannot be directly read on the scale plate but must be found by calculation. For instance if an object of 2.5 meters in size is observed and the pointer $k$ is again opposite the point of the scale with the denomination 25 then the distance of such object would be 250 meters. In order to avoid such calculation the graduation of the scale device may be made as illustrated in Fig. 5 of the drawing where $m$ is a fixed distance scale engraved in a fixed transparent plate covering scale plate $i$, such fixed distance scale corresponding to the pointer $k$ in Figs. 2 and 3 whereas the graduation of the scale plate $i$ consists in a set of curved lines. The fixed transparent plate carrying the distance scale $m$ may be mounted in any suitable way (not shown on the drawing) on the casing of the instrument.

The adjustment of the instrument is the same as above described, that is to say on observation of an object of known size plates $a$ and $b$ are so adjusted by rotating knob $f$ that the parts of the image appearing one at the side of the other are displaced with relation to each other for a distance equal to the size of the image of the object as appears from Fig. 5 of the drawing. The distance of the object is indicated by that curved line on scale plate *i* which crosses that point of the fixed distance scale which indicates the size of the observed object. If for instance in the case of Fig. 5 of the drawing the distance of the observed ship from the level of the water to the top edge of the chimney is again 25 meters then the distance of said ship indicated by the instrument would be 1000 meters because the curved line corresponding to a distance of 1000 meters crosses the point 25 of the distance scale.

The measuring device with the rotatable wedge-shaped disks *a*, *b* forms a unit for itself and could be used for distance measuring purposes without further appliances. However it would practically hardly be possible to see the distant objects sufficiently sharp in order to allow exact adjustment of the wedges *a*, *b*. Therefore, the instrument is practically used as a supplement of a telescope and in this case is placed before the ocular. Such arrangement is shown in Fig. 1 of the drawing where the ocular is designated *n*. In view of the fact that the eye *l* of the observer must be positioned behind the measuring device it is necessary to use for the purpose in question telescopes having their exit-pupil at a comparatively large distance from the ocular as is the case with the device shown in Fig. 1 of the drawing. In this case the two parts of the image are not clearly separated from each other by the edges of the wedge-shaped plates, because the edges are not positioned in an image plane of the telescope. The parts of the image will overlap—as however not shown on the drawing—this being of special advantage in the observation of moving objects as seen from ship board.

What I claim is:—

1. In a distance measuring instrument two pivotally mounted members having wedge-shaped transparent plates, a casing having a tubular part the transparent wedge-shaped plates projecting into said tubular casing from one side, the projecting edges of said plates having a circular form and being in line with each other, an actuating device for said wedge-shaped plates adapted to turn them in opposite directions and an index mechanism comprising a rotatable scale plate coupled with said actuating device for the wedge-shaped plates.

2. In a distance measuring instrument two wedge-shaped transparent plates each firmly connected with a metal hub piece, a casing having a tubular part, said wedge-shaped transparent plates projecting into said tubular part of the casing from one side and being provided with circular edges in line with each other, the metal hubs of said wedge-shaped plates pivotally mounted so as to be rotatable about the axis of the circular edges of the transparent plates and each provided with a toothed edge, an actuating shaft, a pinion thereon meshing with the toothed edges of the wedge-shaped plates, a rotatably mounted scale disk mounted substantially parallel to said actuating shaft, a gear connection between said scale disk and said shaft adapted to rotate the scale disk with higher speed than the wedge-shaped plates.

3. In a distance measuring instrument two pivotally mounted members having wedge-shaped transparent plates, a casing having a tubular part the transparent wedge-shaped plates projecting into said tubular casing from one side, the projecting edges of said plates having a circular form and being in line with each other, two circular transparent plates mounted within said tubular casing one on each side of th pair of wedge-shaped plates so as to form a protecting receptacle for same.

In testimony whereof I have signed this specification in the presence of two subscribing witnesses.

JULES HUMBRECHT.

Witnesses:
 WOLDEMAR HA PT,
 HENRY HASPER.